Feb. 11, 1964 K. A. O. HEINZE 3,121,035

HIGH TEMPERATURE ELECTRIC INSULATOR

Filed July 5, 1960

INVENTOR
*K. A. O. HEINZE*

BY
Frank R. [signature]
AGENT

United States Patent Office 3,121,035

Patented Feb. 11, 1964

3,121,035

HIGH TEMPERATURE ELECTRIC INSULATOR

Karl Alexander Otto Heinze, Hamburg-Niendorf, Germany, assignor to North American Philips Company, Inc., New York, N.Y., a corporation of Delaware Filed July 5, 1960, Ser. No. 40,942
Claims priority, application Germany July 7, 1959
8 Claims. (Cl. 148—33)

Figure 1:
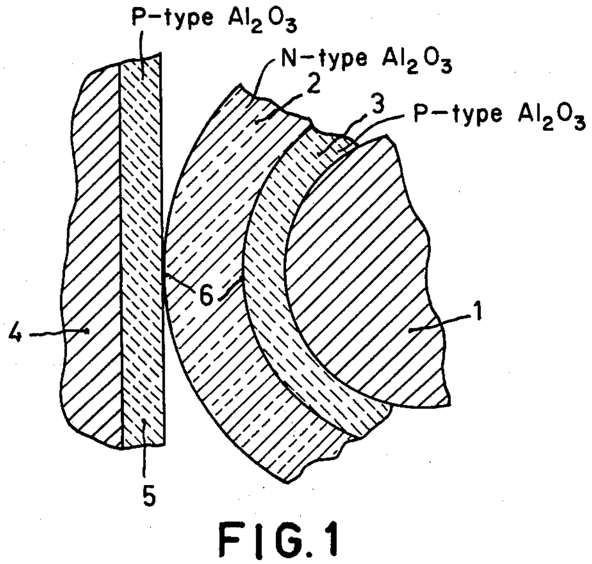

It is known that all the commonly used insulators are slightly conductive and that this conductivity increases at increasing operating temperature. The conductivity is based, according to the type of the insulating material, on ionic conductivity or on electronic conductivity. Insulating materials which become electronically conductive in a preferred direction, at higher temperatures behave as semiconductors. This means that in these insulating materials first an impurity-conductivity occurs at increasing temperature which conductivity passes into the intrinsic conductivity at very high temperatures. In the field of the impurity-conductivity, the insulating materials with preferred direction for the electronic conductivity distinguish in that the one material has electron conductivity (n-conductivity type) and the other material has hole-conductivity (p-conductivity type). The increase of the conductivity at increasing temperatures is disadvantageous since, in particular in the case of thin insulating layers, the danger exists that the breakdown conductivity is reached and breakdown occurs.

It is known from the semiconductor technology that a rectifying effect occurs at the junction point of a p-conductive layer on an n-conductive layer; when setting-up a bias voltage at the n-conductive layer, which is positive in comparison with the bias voltage applied to the p-conductive layer, only very small currents flow through such a semi-conductive device. The direction of flow in which only small currents flow, is indicated as blocking direction. Owing to the strong blocking effect, very high reverse voltages may be set-up at a rectifier which has a p-n-transition without break-down occurring. At the same time, a very high capacitance is formed at the p-n-transition which is employed for the manufacture of capacitors.

The invention is based on the discovery that the rectifying and blocking effects respectively known from the semi-conductor technology also occur in insulating materials with preferred direction for the electronic conductivity and that, in particular at higher temperatures, the currents flowing through the insulating materials are influenced by this blocking effect. However, the blocking effect at the junction point is only operative in the blocking direction. In the other direction on the contrary, the currents flowing through the insulator are stopped insufficiently. An insulator provided with a p-n-junction point would therefore have a sufficient insulation only when using direct current-voltages and not when using alternating current-voltages.

According to the invention, a satisfactory insulation is obtained, also at higher temperatures of for example 1000° C., with an insulator from a material having a preferred direction for electronic conductivity, which insulator in the desired insulating direction consists of two or more layers of insulating materials having semi-conductive properties of opposite conductivity type succeeding each other alternately.

The insulator according to the invention has several p-n-junction points between n- and p-conductive-layers succeeding each other alternately, preferably of a polycrystalline structure, which sufficiently decrease the insulation currents when applying both alternating current-voltage and direct-current voltage.

By deliberately providing several p-n-junction points blocking in different directions, an insulator of a very high break-down strength and high resistance is obtained.

The layers of alternate conductivity type may be obtained for example by doping the layer of the one conductivity type, which layer preferably consists of purified $Al_2O_3$, with substances suitable for doping, for example oxides of alkaline earth metals or spinels of the formula: $M^{2+}.M_2^{3+}.O_4^{2-}$.

The contact surfaces of the n- and p-conductive layers adjoining each other, the p-n-junction points, are present very sharply after stratifying. This results in the fact that high barrier layer capacitances are present at these surfaces which result in wattless currents when setting up alternating current voltages. To avoid these undesired capacitances, the insulator is therefore sintered, after stratifying at temperatures which are so high that a noticeable widening from the contact surfaces to transition zones is reached by diffusion. Sintering is preferably carried out above a temperature of 1200° C. and it may be carried out, according to the type of the insulating material used, in a protective gas atmosphere, in air, or also at reduced pressure. To accelerate the diffusion process it appears to be very advantageous to set up an alternating current voltage at the insulator during sintering.

The insulator according to the invention is particularly suitable for increasing the break-down strength between cathode and heating member of electric discharge tubes and renders these tubes better humfree.

Figure 2:
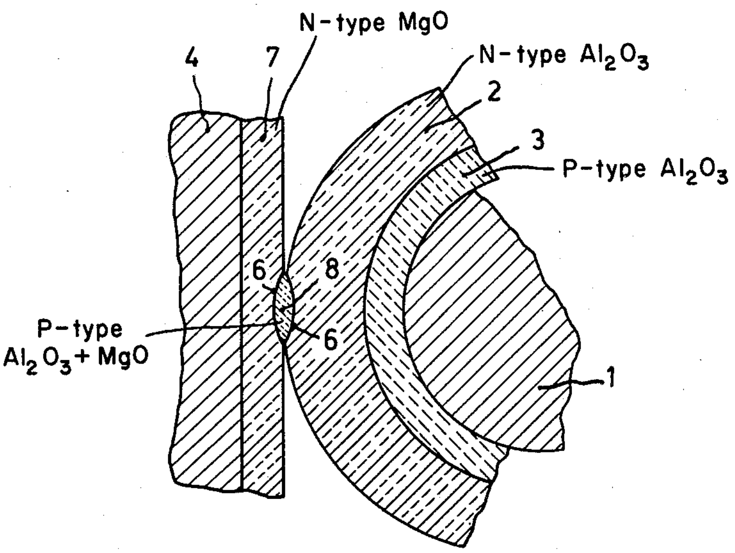

In order that the invention may readily be carried into effect it will now be described, by way of example, with referenec to the embodiments shown in the accompanying drawing, in which FIG. 1 is a sectional view of a cathode of an electric discharge tube which is provided with an insulator according to the invention;

FIG. 2 is a sectional view of a modified embodiment of the insulator for the cathode of an electric discharge tube.

The filament 1 consisting of tungsten of the cathode of an electric discharge tube is covered with a polycrystalline layer 2 of purified n-conductive $Al_2O_3$. Close to the surface of the filament 1, a p-conductive $Al_2O_3$-layer 3 has formed on covering with $Al_2O_3$ by means of reaction substances of tungsten.

The inner wall 4 of the cathode jacket is covered with a polycrystalline $Al_2O_3$-layer 5 which is converted into a p-conductive layer by doping. The doping is carried out by means of the spinel $MgAl_2O_4$. Also the alkaline earth metal oxides MgO and BeO, however, are suitable for doping. It was established experimentally that in the case of purified $Al_2O_3$, already 5–10% by weight of MgO are sufficient to arrive at least at one p-conductive contact layer owing to spinel formation. Between the insulation layers 3, 2 and 5 there are two junction points 6, in this insulator which are suficient to obtain small wattless currents through the insulator at any polarity of the voltage between the tungsten filament and the cathode jacket.

In the embodiment shown in FIG. 2, the tungsten filament 1, as in the case of the embodiment shown in FIG. 1, is covered with a polycrystalline n-conductive $Al_2O_3$-layer 2 which is transformed into a p-conductive layer 3 close to the filament 1. The inner wall 4 of the cathode jacket, however, is covered with an n-conductive polycrystalline MgO-layer 7. At the point where the n-conductive MgO-layer 7 makes contact with the n-conductive $Al_2O_3$-layer 2, a p-conductive intermediate layer 8 has formed owing to diffusion of the MgO in the $Al_2O_3$. Between the insulation layers 3, 2, 8 and 7 there are 3 junction points in this insulator which guarantee an even better suppression of wattless currents in the insulator.

What is claimed is:

1. An insulator having a preferred electronic conductivity at high temperatures consisting essentially of a plurality of adjoining layers of insulating materials which become semi-conductive at higher temperatures, alternate layers being of n-conductive $Al_2O_3$ separated by a p-conductive layer whereby successively adjoining layers form junctions of opposite conductivities.

2. An insulator having a preferred electronic conductivity at high temperatures consisting essentially of a plurality of adjoining layers of insulating materials which become semi-conductive at higher temperatures, alternate layers consisting of n-conductive $Al_2O_3$ separated by a p-conductive layer of $Al_2O_3$ doped with an oxide of an alkaline earth metal whereby successively adjoining layers form junctions of opposite conductivities.

3. An insulator having a preferred electronic conductivity at high temperatures as claimed in claim 2 in which the p-conductive layer of $Al_2O_3$ is doped with an oxide of an element selected from the group consisting of Mg and Be.

4. An insulator having a preferred electronic conductivity at hgh temperatures consisting essentially of a plurality of adjoining layers of insulating materials which become semi-conductive at higher temperatures, alternate layers consisting of n-conductive $Al_2O_3$ separated by a p-conductive layer of $Al_2O_3$ doped with a spinel whereby successively adjoined layers form junctions of opposite conductivities.

5. An insulator having a preferred electronic conductivity at high temperatures thereof as claimed in claim 4 in which the spinel is $MgAl_2O_4$.

6. A high temperature insulator consisting essentially of at least three successively adjoining layers of an insulating metal oxide selected from the group consisting of $Al_2O_3$ and MgO, two of said layers being of a given conductivity type separated by a layer of opposite conductivity type.

7. A high temperature insulator consisting essentially of two layers of p-conductivity type $Al_2O_3$ separated by a layer of n-conductivity type $Al_2O_3$.

8. A high temperature insulator consisting of a layer of p-conductive type $Al_2O_3$, a layer of n-conductivity type $Al_2O_3$ adjoining said p-conductive layer of $Al_2O_3$, and a layer of n-conductvity type MgO separated from said n-conductive layer of $Al_2O_3$ by a layer of p-conductive $Al_2O_3$ and MgO.

References Cited in the file of this patent

UNITED STATES PATENTS

| | | |
|---|---|---|
| 2,089,817 | Stutsman | Aug. 10, 1937 |
| 2,795,742 | Pfann | June 11, 1957 |
| 2,836,776 | Ishikawa et al. | May 27, 1958 |
| 2,914,665 | Linder | Nov. 24, 1959 |
| 2,959,504 | Ross et al. | Nov. 11, 1960 |
| 3,082,126 | Chang | Mar. 19, 1963 |